June 27, 1961   J. M. HOFF   2,990,154
VALVING MEANS
Filed Sept. 15, 1958

INVENTOR.
JOHN M. HOFF
BY
Oberlin, Maky, & Donnelly
ATTORNEYS

United States Patent Office 2,990,154
Patented June 27, 1961

---

2,990,154
VALVING MEANS
John M. Hoff, Mansfield, Ohio, assignor to The Tappan Company, Mansfield, Ohio, a corporation of Ohio
Filed Sept. 15, 1958, Ser. No. 761,155
2 Claims. (Cl. 251—7)

The present improvements relate to valving means designed for remote or automatic control of the operation thereof and are more particularly concerned with valves of this type especially suited for use in gas burning appliances such as cooking ranges and the like.

It is a primary object of this invention to provide a two way valve or valving means of the type indicated which is notably simple in construction, economical to produce, and efficient with respect both to control of its functioning and to the action of the device available for regulation of fluid flow through the same.

Another object is to provide such a valve wherein the fluid passage therethrough is defined by a flexible conduit or tube, whereby such passage is continuous completely to contain the fluid, and improved actuator mechanism adapted for remote or automatic control is operative to close such passage by compression of the tube.

It is also an object of the invention to provide such flexible tube valving means in which the mechanism for compressing and releasing the same is thermo-electric in nature and controllable by any appropriate energization system or circuit. For example, in gas range use, the new valve may readily be operated by timer means such as utilized in automatic oven control, by a meat thermometer of usual type adapted to actuate electric circuit contacts, or simply by remote manual switching.

With especial regard to such range use, an additional object is to provide such valving means capable of operation under high ambient temperature conditions.

A further object is to provide an improved form of safety control such as used in gas oven supply lines, with the valving means thereof including a flexible tube as discussed in the foregoing.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail an illustrative embodiment of the invention, this being indicative, however, of but a single way in which the principle of the invention may be employed.

Figure 1:
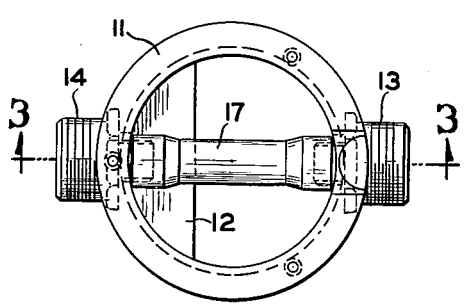
FIG. 1 is a top plan view of a valve made in accordance with the present invention.

Referring now to the drawings in detail, the valve illustrated comprises a cylindrical casing or housing 10 having a flange 11 about its open top and being closed at the bottom. For a purpose to be described, the upper surface of the bottom wall is formed with a raised or stepped portion 12 which here extends over less than half the area of the bottom and is contiguous with the side wall.

Inlet and outlet fittings 13 and 14 respectively are secured in diametrically opposite openings provided therefor in the casing side wall, these fittings having reduced inner end portions or nipples 15 and 16 which project into the space within the housing. It will be noted that the nipple or inner end portion 16 is positioned slightly above the raised surface 12 of the bottom wall, and a flexible tube 17 extends through the casing from one nipple to the other, with its ends respectively stretched over the same or fastened thereto in any other suitable manner to provide a continuous fluid passage from one fitting to the other.

A circular cover plate 18 is provided to close the top of the casing, and disposed against the underside of such plate, there is a bimetallic leaf 19 extending substantially diametrically from an outer edge portion of the cover. At such outer end, the leaf is formed with a short tab 20 having an aperture 21 therein, while the main extent of the leaf is off-set from such tab portion, downwardly in the illustrated arrangement. A T-shaped member 22 is secured in inverted depending relation on the other or free end of the bimetallic leaf, with its cross bar 23 at right angles to the same and a nut 24 being threaded on its upper end against the top surface of the leaf.

The periphery of the cover rests on the top flange 11 of the casing and is secured thereto by means of small screws 25. The leaf extends in substantially parallel relation above the flexible tube 17 and where its tab portion 20 overlies the top of the casing wall, the latter is recessed to accommodate the thickness of such tab. At this region, a bolt 26 is passed upwardly through the flange 11, the aperture 21 of the leaf tab, and the cover 18. Such bolt forms a terminal post, with two nuts 27 threaded thereon and a metal wire terminal piece 28 secured between the same.

Figure 2:
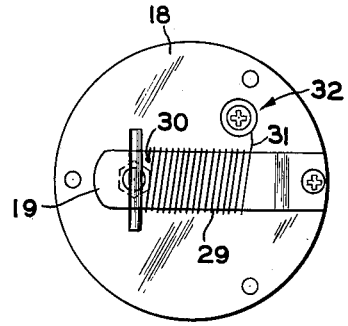
FIG. 2 is a bottom plan view of a cover for such valve.
Figure 3:
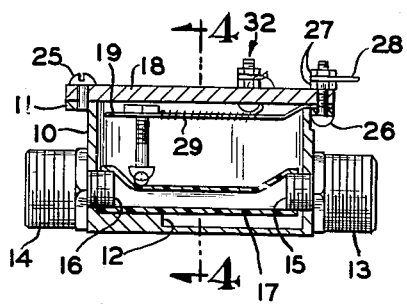
FIG. 3 is a sectional view of the valve with the cover of the same in place.
Figure 4:
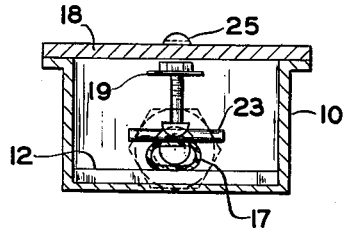
FIG. 4 is a further sectional view at right angles to the section of FIG. 3 and indicated by the line 4—4 in FIG. 3.
Figure 5:
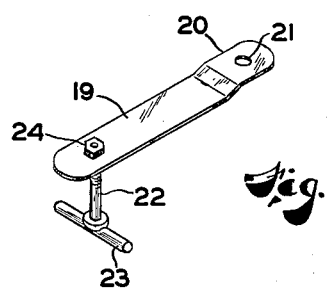
FIG. 5 is a perspective view of the actuator of such valve.

An insulated resistance wire 29 is wound about the main portion of the bimetallic leaf, with one of its ends 30 soldered or otherwise electrically bonded to the leaf (FIG. 2) and its other end 31 connected to a second terminal post designated generally at 32 and similar to the one previously described. As thus assembled, the inverted T-shaped member 22 is positioned and held by the bimetallic leaf 19 with its bar 23 at the top surface of the flexible tube 17 above the end portion thereof which at its undersurface engages or is spaced just slightly above the raised portion 12 of the bottom wall of the casing. Such member will be seen to act as a poppet effective when moved downwardly to compress the tube cooperably with such raised portion until the tube is fully closed or sealed at this point. The length of the bar 23 and the transverse extent of the underlying step 12 will be adequate to accommodate the lateral deformation of the tube when thus constricted without loss of complete engagement therewith.

It will accordingly be seen that this structure constitutes an extremely simple two way valving means adapted to be connected in a fluid line, such as a gas range line, and to be controlled by an appropriate electrical system operative to cause low voltage current to flow through the resistance wire 29. Such current flow of course heats the bimetallic leaf 19 to deflect the same, here in the downward direction to compress or pinch the flexible tube 17. In the illustrated construction, the valve would normally be open and energized for closure, but it will be clear that the bimetallic leaf could as well be positioned normally to hold the tube compressed and to deflect upwardly when heated, whereupon the device would be energized for the open condition of the same. If the cover and casing are not formed of electrically insulative material, the leaf and terminals will of course be suitably insulated therefrom.

It will also be apparent that such valve can be actuated by manual switching or made automatically responsive to the occurrence of various external conditions, since all that is needed is some means to open and close the energization circuit for the heater wire. Thus, the valve may be used in a gas oven to shut off the supply of gas after a predetermined elapsed period of time by timer control of the valve which, in this case, would most likely be normally closed and energized to hold the same open for the desired interval. Devices, such as conventional meat thermometers, adapted to determine the cooking time in accordance with actual temperature of the food can likewise be used with the valve disclosed, these being of course but a few of the automatic control possibilities.

Since in this range application, and likely others as well, the valve may be exposed to a considerable amount of heat, the flexible tube is preferably made of silicone rubber or other commercially available materials which are not only resiliently deformable but able to withstand high temperatures.

The structure of the invention thus provides a resiliently deformable fluid conduit manipulated by simple and easily controlled mechanism wholly outside the flow passage. The T-shaped member is illustrated as having a circular section and it is preferred that at least the surface thereof which engages the tube be arcuate to reduce wear and of such relative size as to provide well-defined lines of compression. With further regard to the composition of the flexible tube, other examples of materials having, like the silicone rubber previously mentioned, the preferred stability at fairly high temperatures are polytetrafluoroethylene, known as "Teflon" (Du Pont) and polychlorotrifluoroethylene, known as "Kell-F" (Minnesota Mining & Mfg.).

Other modes of applying the principle of the invention may be employed, change being made as regards the details described, provided the features stated in any of the following claims or the equivalent of such be employed.

I, therefore, particularly point out and distinctly claim as my invention:

1. Thermo-electric valve means for use with a gas cooking range and the like to control the flow of gas therein, comprising a closed housing provided with an inlet and an outlet and being adapted for connection therethrough in a gas supply line of such a range and the like, a tube made of resiliently deformable material extending through said housing with its ends respectively connected to the inlet and outlet of the same to contain therewithin the flow of the gas through the valve means, said tube being generally elliptical in cross-section and thus having relatively flat opposed sides, the housing being formed with a stationary backing surface therein against which the tube is disposed, with one of the relatively flat sides of the latter in contact with said backing surface, a bi-metallic leaf mounted within the housing and having an unsecured portion which deflects upon heating of the leaf, an actuator connected to said unsecured portion of the bi-metallic leaf to be moved by deflection thereof and hence in response to heating of the leaf, said actuator being disposed in transversely extending relation to the tube at the other relatively flat side of the same in opposition to the stationary backing surface of the housing, the actuator being movable by the leaf between two positions of adjustment respectively corresponding to heated and unheated conditions of the leaf, with the actuator in one of said two positions of adjustment compressing the tube against the stationary backing surface to close the tube against flow of gas therethrough and in the other position being substantially withdrawn from the tube to permit such flow, whereby the bi-metallic leaf and actuator are operative to close and open the valve means, and electric circuit means for controlling such operation of the valve means, said circuit means including an electric heating element in juxtaposition to the bi-metallic leaf for controlled heating of the same.

2. Thermo-electric valve means as set forth in claim 1 characterized further in that the tube is made of a material having high temperature stability equivalent to that of silicone rubber.

References Cited in the file of this patent

UNITED STATES PATENTS

| 1,700,428 | Breese | Jan. 29, 1929 |
| --- | --- | --- |
| 2,077,735 | Beckler | Apr. 20, 1937 |
| 2,241,086 | Gould | May 6, 1941 |
| 2,250,117 | Noblitt | July 22, 1941 |
| 2,396,544 | Voyle | Mar. 12, 1946 |
| 2,576,808 | Perkins | Nov. 27, 1951 |
| 2,588,212 | Erlauf | Mar. 4, 1952 |
| 2,674,435 | Angell | Apr. 6, 1954 |

FOREIGN PATENTS

| 142,472 | Austria | July 25, 1935 |
| --- | --- | --- |
| 159,554 | Australia | Mar. 4, 1954 |